Dec. 4, 1951        B. M. OLIVER        2,577,355

PULSE FORMING AND SHAPING CIRCUITS

Filed Dec. 9, 1944        4 Sheets-Sheet 1

INVENTOR
B.M. OLIVER
BY *Hugh S. Wertz*
ATTORNEY

Dec. 4, 1951   B. M. OLIVER   2,577,355
PULSE FORMING AND SHAPING CIRCUITS
Filed Dec. 9, 1944   4 Sheets-Sheet 2

INVENTOR
B. M. OLIVER
BY
Hugh S. Wertz
ATTORNEY

Dec. 4, 1951 — B. M. OLIVER — 2,577,355
PULSE FORMING AND SHAPING CIRCUITS
Filed Dec. 9, 1944 — 4 Sheets-Sheet 4

Patented Dec. 4, 1951

2,577,355

UNITED STATES PATENT OFFICE 2,577,355

PULSE FORMING AND SHAPING CIRCUITS

Bernard M. Oliver, New York, N. Y., assignor to Bell Telephone Laboratories, Incorporated, New York, N. Y., a corporation of New York Application December 9, 1944, Serial No. 567,406

3 Claims. (Cl. 250—27)

This invention relates to electric circuits and more specifically to pulse forming and shaping circuits.

In a pulse reflection type image locating and distance measuring system (frequently called a "radar") ultra-high frequency waves are directively emitted in pulses of very short time duration; reflections thereof are received from objects upon which the emitted pulses impinge; and the reflection delay times for particular objects are determined to provide indications of the distances to the objects from which the respective reflected signals are received. Electrical variations received at the receiving point constitute a plurality of impulses, which might be made up, for example, of a series of trains of pulses, each train comprising, for example, a transmitted pulse and one or more reflections or echo pulses from objects in the radio beam interspersed with and supplemented by variations due to noise, etc. Due to differences in size and distance of the objects from which pulses are reflected and to many other causes, including the depth of the object, the echo pulses are not of the same size and shape and some are of much longer duration than others. Frequently the need arises, such as in radar equipment normally making use of echo pulses for tracking or other purposes, for apparatus for producing a series of impulses of substantially equal intensity and duration from the series of impulses in the output of the receiver. The present invention, in one of its aspects, serves to answer this need. In another of its aspects, the invention relates to the provision of a circuit arrangement for producing a group or series of rectangularly shaped pulses, all of the same amplitude, from a group or series of pulses, at least some of which are dissimilar in shape or width and which may be of dissimilar amplitude. In one of its aspects the present invention is directed to means for forming a train of pulses of substantially uniform shape and size from a train of pulses some at least of which are dissimilar in shape or size.

In accordance with a somewhat different aspect of the invention, there is provided apparatus for forming trains or series of rectangularly shaped pulses from a plurality of pulses some at least of which are non-rectangular in shape.

The invention may also be broadly characterized as novel means for transforming pulses into other pulses so as to control the character of the latter.

In accordance with one illustrative embodiment of the invention, there is provided a pulse forming and shaping circuit adapted to have applied thereto a plurality of trains of signal pulses, the various pulses of each train in general having dissimilar shapes, amplitudes and spacings from adjacent pulses, but the amplitude, shape and spacing of each pulse in the train being substantially equivalent to that of the corresponding pulse in the immediately preceding and following series, and to produce in its output circuit a series of square-topped pulses of substantially constant amplitude and similar shape, the starting time of each of the output pulses coinciding with the starting time of each of the pulses in the corresponding input series. The incoming signals to the pulse forming and shaping circuit are amplified and inverted in polarity if necessary to produce the positive pulses. The positive pulses are then applied to a "clipper" tube which removes all the noise variations below a certain level from the series of pulses. The output of this tube is applied to a shaping network comprising an inductance member and a capacity member connected in a series circuit including a source of potential, the inductance member being shunted by means for damping out certain of the oscillations produced in the circuit. In this particular embodiment, the damping means comprises the grid-cathode circuit of a following amplifier tube. The tuned circuit comprising the condenser and the inductance member is shock-excited by the pulses from the "clipper" tube and each of the resultant oscillations is damped within a fraction of an oscillation cycle. The duration of the output pulse can be changed by varying the constants of the tuned circuit. This duration is less than the duration of the pulses in the output of the clipper. The tuned circuit causes shaping of the pulses by generating a cosinusoidal oscillation in response to the leading edge of each pulse, the first quarter cycle (negative) of this oscillation being used, the remainder of this oscillation, as well as the entire oscillation which would normally have been set up in response to the trailing edge, being damped by the damping means. Both the upper and lower portions of the pulses produced by the tuned circuit are clipped and the intermediate portion amplified to produce square-topped pulses of constant amplitude and of constant duration.

In a second illustrative embodiment, the tuned shaping network comprises an inductance member and a condenser member connected in a series circuit as in the first embodiment but damping is provided by means of a diode connected across the inductance member in such a way that its anode is grounded. In this arrangement, the oscillation which normally would be set up in the tuned circuit by the leading edge of each of the pulses is immediately damped and only the first quarter cycle (positive) of the oscillation initiated by the trailing edge of each pulse is utilized, the remainder of this oscillation being damped. The clipping amplifier tube immediately following the tuned circuit is biased to cut-off in this embodiment, while in the preceding embodiment this corresponding tube is normally conducting in the absence of pulse signals in its input circuit.

In a third illustrative embodiment, the tuned shaping network comprises a parallel connected inductance member and a condenser member. In such an arrangement, the oscillation initiated in the shaping network intercepts the zero axis at a point where the time $t = T/4 + \Delta t/2$ where $T = 2\pi/\omega =$ the period of the oscillation, and $\Delta t$ is the width of the driving pulse, $t$ being taken equal to zero at the start of the input pulse (the pulse used to shock-excite the tuned circuit). At this point the oscillation becomes positive and is damped by damping means similar to that in the first embodiment. The pulses are clipped at both lower and upper ends and the intermediate portion amplified as before.

The invention will be more readily understood by referring to the following description taken in connection with the accompanying drawings forming a part thereof in which.

Figure 2:
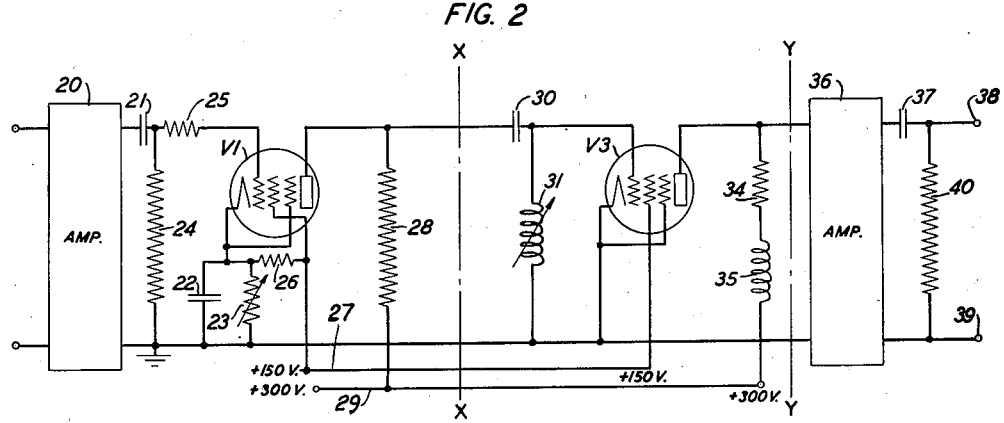
Fig. 2 is a more detailed schematic circuit diagram of the portion 14 of the system shown in Fig. 1.
Figure 3:
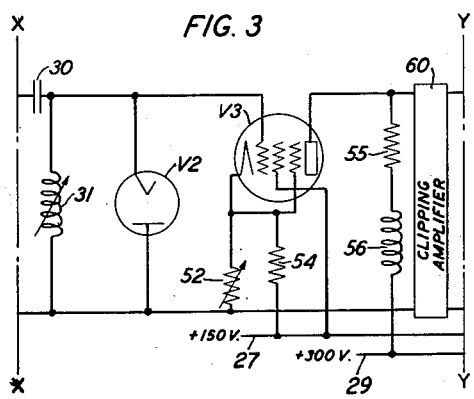
Figure 4:
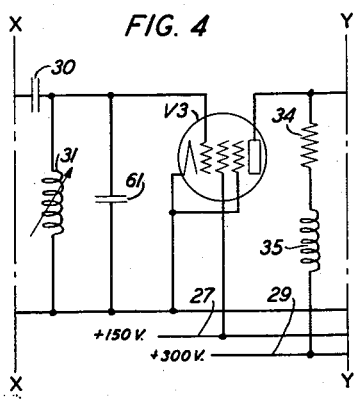
Figure 5:
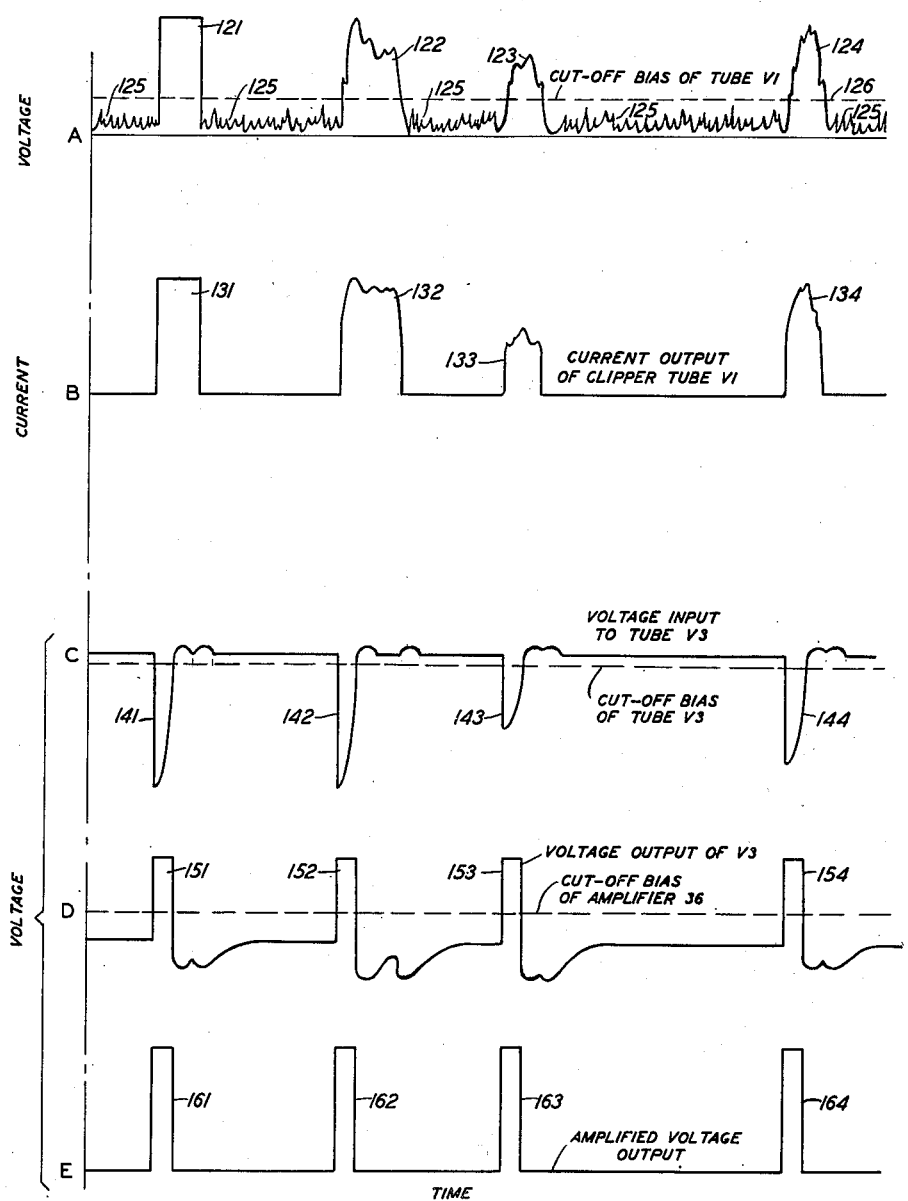
Figure 6:
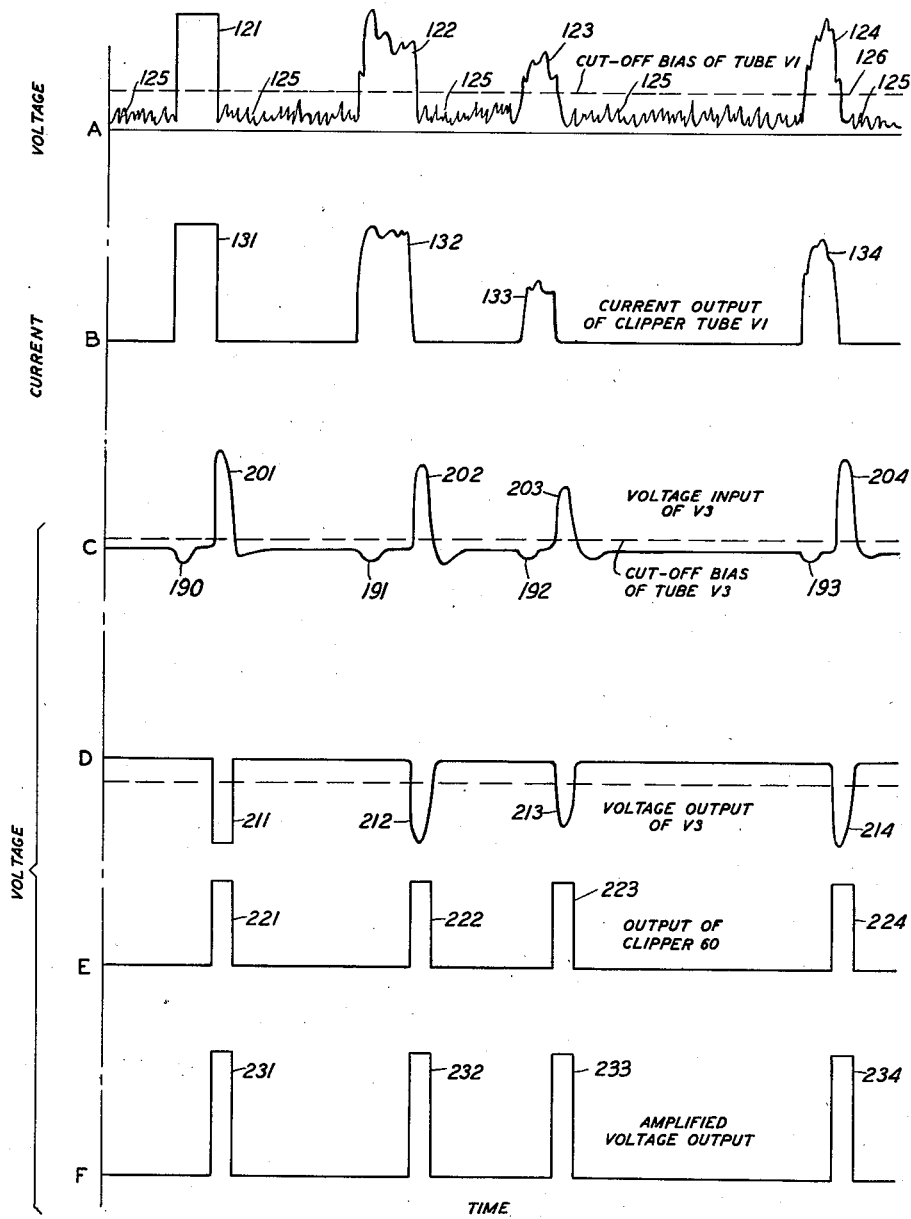
Figure 7:
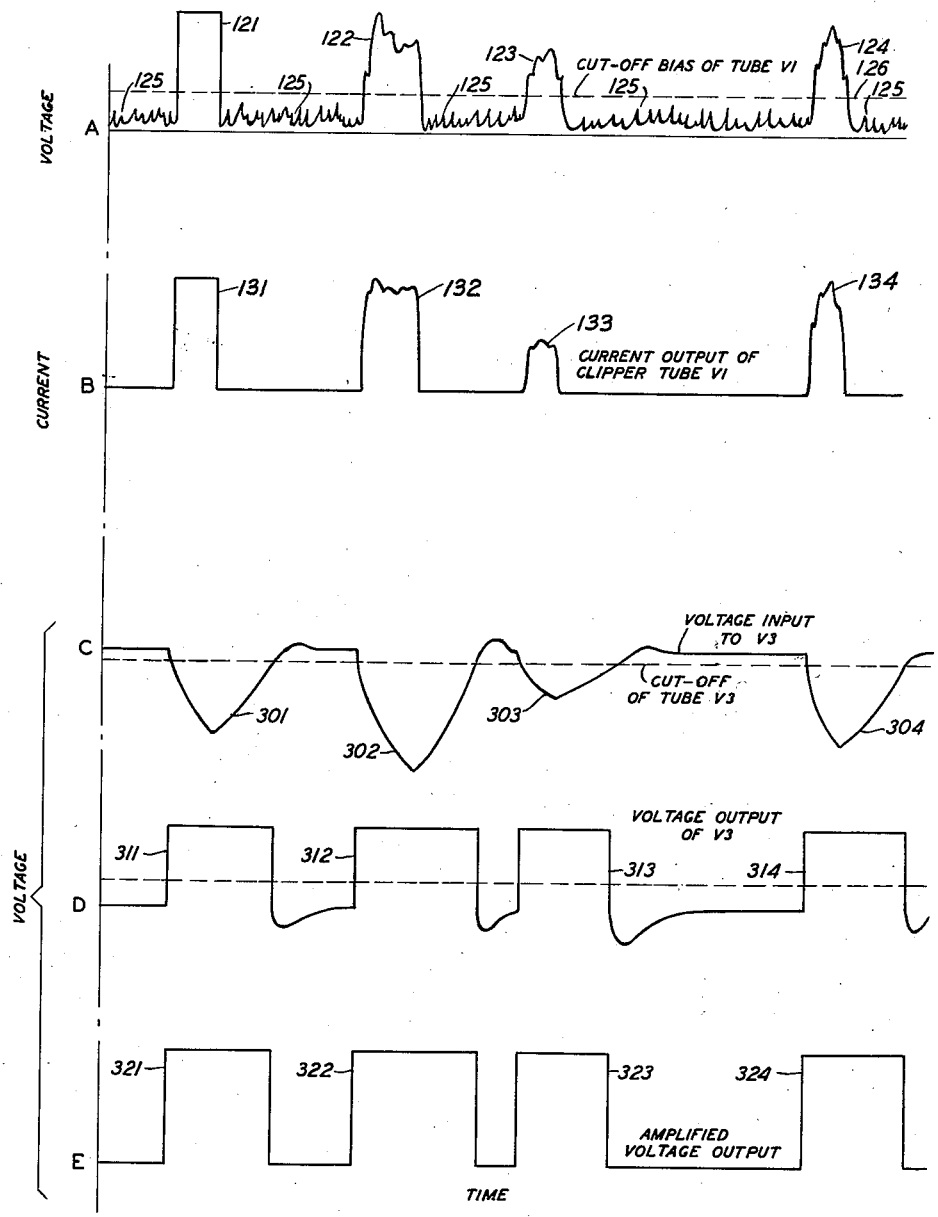

Figs. 3 and 4 illustrate modifications of the portion of the circuit shown in Fig. 2 between lines XX and YY; and Figs. 5, 6 and 7 are various graphical representations to aid in understanding the operation of the arrangements of Figs. 2, 3 and 4, respectively.

Figure 1:
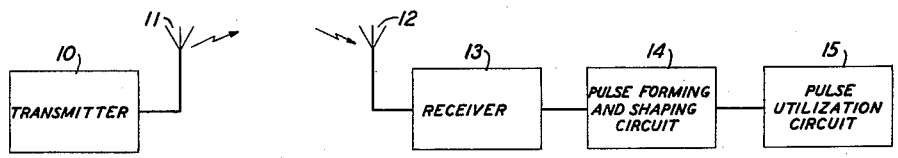
Fig. 1 is a block diagram of an object detecting and distance measuring system of the pulse reflection type.

Referring more specifically to the drawings, Fig. 1 shows, by way of example to illustrate the invention and in block diagram form, an object detecting and distance measuring system of the pulse reflection type. In the arrangement of Fig. 1, a transmitter 10 is provided to supply ultra-high frequency pulse-modulated radio waves (usually called "transmitted pulses" or "emitted pulses") which can be directed at various objects by means of an antenna 11. By way of example, transmitter 10 can comprise an oscillator for providing a sine wave having a suitable periodicity, such as 400 cycles per second, for example. This oscillator energizes a pulse generator of any one of several suitable types well known in the art; for example, see United States Patent 2,117,752, issued May 17, 1938, to L. R. Wrathall, which shows a generator which provides an energy pulse at a particular point of each cycle of the input wave provided to it. The pulse from the pulse generator is then applied to a carrier generator and modulator of any suitable type. Radio frequency pulses therefrom are then applied to the transmitting antenna 11. Pulses reflected from one or more objects within the range of the transmitting antenna 11 (echoes) are received by a receiving antenna 12. The antennas 11 and 12 are of any suitable type; for example, they can be of the polystyrene "polyrod" type disclosed in an application of G. E. Mueller, Serial No. 469,284, filed December 17, 1942, and which issued as Patent 2,425,336 on August 12, 1947. The transmitted pulses and the reflections thereof picked up by the receiving antenna 12 are applied to a receiver 13 of any suitable form wherein they are, for example, amplified, detected, further amplified and applied to the pulse forming and shaping circuit 14 which may comprise one of the circuits shown in Figs. 2, 3 and 4. The input pulse wave to the pulse shaping circuit 14 is shown in Fig. 5 at line A, while the output pulse wave from such a circuit 14 comprises a pulse wave of the type shown in line E of Fig. 5, 6 or 7. The output waves of one of the pulse shaping circuits of this invention can be applied to an oscilloscope for direct visual indication of the echo pulses (or rather their counterparts produced by the pulse shaping circuit 14) or they may be applied to an "automatic tracking" circuit arrangement of the type disclosed in a copending application of B. M. Oliver, Serial No. 486,780, filed May 13, 1943, and which issued as Patent 2,433,863 on January 6, 1948. Such an oscilloscope or automatic tracking arrangement has been characterized as a pulse utilization circuit and represented by the box 15. As the pulse utilization circuit forms no part of the present invention, it is not being described in detail.

Reference will now be made to Fig. 2 which shows in circuit diagram form one embodiment of a pulse shaping circuit 14 and to Fig. 5 which shows relationships of voltage versus time and current versus time at various points in the circuit of Fig. 2. A plurality of trains of electrical variations such as that shown in Fig. 5, line A, and repeated, for example, 400 times per second, is formed in the output circuit of the amplifier 20 of any well-known construction. Each train may comprise, for example, a transmitted pulse 121 and one or more echo pulses 122, 123, 124, etc. Even though the object producing the reflections is moving with respect to the observing station, this movement produces such a slow corresponding movement of the echoes along the reference axis that each series has its echo pulses in substantially the same position as the corresponding echo pulses in the preceding and following series. Between each of the echo pulses and also contributing to them are spurious variations designated by the reference character 125. These spurious or "noise" variations have peaks which are not necessarily in the same position in each series. While the transmitted pulses and their echoes in the output of the receiver 13 may be in either the positive or negative direction, the amplifier 20 serves to amplify and (if necessary) to invert the phase of these pulses to produce the wave shown in Fig. 5, line A. This wave is applied to the tube VI through the coupling condenser 21. Grid bias is provided by means of the condenser 22 and the resistor 23 shunted thereacross, these two elements being connected between the cathode and ground, and a resistor 26 connected between cathode and the plus 150-volt supply. A leak resistor 24 and an "anti-sing" resistor 25 are also included in the circuit between ground and the control grid of this tube. The screen grid is connected to the positive terminal 27 of the 150-volt supply, while the anode is connected through the anode resistor 28 to the positive terminal 29 of a source of direct potential of about 300 volts. The bias produced by the members 22, 23 and 26 is adjusted so that all portions of the voltage wave shown in Fig. 5, line A, below the dotted line 126, designated the cut-off bias of the tube V1, do not produce a corresponding output current. The output current of the tube V1 is shown in Fig. 5 at line B. This output is applied to the tuned circuit comprising the condenser 30 and the inductance member 31. The pulses 131, 132, 133 and 134, etc., which, if desired, may have the same height (by a proper choice of circuit constants for V1 and its associated circuit elements so that the voltage peaks 121, 122, 123, 124, etc., are sufficiently high to cause saturation), shock-excite the tuned circuit comprising the elements 30 and 31 and tend to produce an oscillation such as that shown at line C in Fig. 5. The leading edges of the current pulses 131, 132, 133 and 134 produce negative pulses 141, 142, 143 and 144 in the input of the tube V3 but any further oscillations are damped because on the first positive pulse following each of the negative pulses 141, 142, 143 and 144, grid current is established in tube V3 thus damping the oscillations. Negative pulses shown in Fig. 5, line C are applied directly to the control grid of the tube V3. The cathode of this tube is connected to the suppressor grid thereof and to ground. The screen grid is connected to the positive terminal of the source of 150 volts. The anode of the tube V3 is connected through a resistor 34 and equalizing inductance member 35 to the positive terminal of the source of 300 volts. The input circuit of the amplifier 36 is connected between the anode of the tube V3 and ground. The tube V3 is driven below cut-off by the negative peaks of the pulses 141, 142, 143 and 144 and grid current in this tube suppresses the positive peaks of these pulses so that in the voltage output of the tube V3 appears pulses 151, 152, 153 and 154, shown at line D of Fig. 5, representing only the portions of the pulses in line C which lie between the cut-off potential and cathode potential of tube V3. The pulses shown at line D are all of substantially the same height and duration since the height is determined by the operating plate current in the tube V3 in the absence of a pulse and their duration is determined by the period of oscillation of the tuned circuit. Neither of these quantities is affected by the exact size and shape of the input pulse. The amplifier 36 amplifies, and, if desired, further clips the output of the tube V3 to produce a series of pulses such as is shown in Fig. 5, line E, all of which are of the same amplitude and duration, the beginning of each pulse being substantially coincident with the beginning of the corresponding transmitted pulse or echo in the series of pulses shown in Fig. 5, line A. Depending upon the number of stages or the circuit connections in the amplifier 36, the pulses 161, 162, 163 and 164 are either positive or negative. By way of example, they have been shown as positive pulses in line E, Fig. 5. By varying the constants of the tuned circuit 30, 31 the duration of each of the pulses 141, 142, 143 and 144 can be varied, but this duration must be less than the duration of the pulses in the output of the clipper tube V1. Varying the duration of the pulses 141, 142, 143 and 144 varies the duration of each of the output pulses 161 to 164, inclusive. The output pulses from the amplifier 36 can be applied through the coupling condenser 37 to the terminals 38 and 39 connected to the pulse utilization circuit 15. A resistor 40 can be included across the terminals 38 and 39, if desired.

A modification of a portion between lines XX and YY of the shaping circuit shown in Fig. 2 is shown in Fig. 3, the circuit shown in Fig. 3 being adapted to be inserted in the circuit of Fig. 2 in place of the portion thereof between these lines. In the modified circuit, a diode V2 is provided and so placed in the circuit that its cathode is connected to the common terminal of the members 30 and 31 and its anode is connected to ground. The cathode of V3 is connected to its suppressor grid and to ground through the resistance member 52, which may be variable. The cathode is also connected to the positive 150-volt supply through resistor 54. The screen grid of this tube is connected to the positive terminal of the source of 150 volts, while the anode is connected through the resistor 55 and the high frequency equalizing inductance member 56 to the positive terminal of the source of 300 volts. The anode of the tube V3 is connected to the amplifier 36 through a clipping amplifier 60.

The circuit shown in Fig. 3 operates as follows: The voltage input to the tube V1 is shown in Fig. 6, line A, and this is, of course, the same as in the circuit of Fig. 2. Moreover, the current output of the tube V1 as shown in Fig. 6, line B, is the same as that shown in Fig. 5, line B. The voltage input to the tube V3, however, is quite different from the corresponding voltage input shown in Fig. 5, line C. This voltage input wave, which is shown in line C of Fig. 6, comprises a number of very small negative pulses, 190, 191, 192 and 193, produced at the times of the leading edges of the pulses 131, 132, 133 and 134, but which are quickly damped because of the fact that the diode V2 is made conducting by each negative pulse, thus preventing the formation of all succeeding oscillations. At the trailing edge of each of the pulses 131, 132, 133 and 134, however, a positive oscillation is first produced and these oscillations are shown in the drawings as the positive pulses 201, 202, 203 and 204. As soon as the voltage becomes negative, the tube V2 conducts and damps the wave. The output voltage of the tube V3 is shown in line D of Fig. 6 and includes the negative pulses 211, 212, 213 and 214. This voltage is applied to a clipping amplifier 60 which may be connected in the same manner as the tube V3 in Fig. 2, to produce a series of output waves 221, 222, 223 and 224, formed in the manner that the pulses 151, 152, 153 and 154 are formed in the circuit of Fig. 2. These pulses are amplified by the amplifier 36 to produce pulses 231, 232, 233 and 234 like those shown in line D of Fig. 5, the only difference being that the beginning of each of the pulses in Fig. 6, line F, coincides substantially with the trailing edge of the various pulses shown in Fig. 5, line A, and Fig. 6, line A, instead of coinciding with the leading edge thereof as in the circuit of Fig. 2. It will be apparent that if pulses 131, 132, 133 and 134 have different durations, the spacing between the various pulses 231, 232, 233 and 234, will not be the same as that between the pulses 161, 162, 163 and 164, comprising the output voltage pulses of the circuit shown in Fig. 2.

In the modification shown in Fig. 4, the condenser 30 has been made relatively large and functions largely as a blocking condenser and a condenser 61 has been connected in parallel with the inductance member 31. The plate resistor 28 in Fig. 2 is assumed to be very large when using the embodiment shown in Fig. 4. The connections of the tube V3 are otherwise the same as in Fig. 2 and corresponding elements have been given the same reference characters in the two figures. When a current wave such as that shown in line B of Fig. 7 (which is exactly the same as that shown in Fig.

5 line B) produced from the voltage input shown in Fig. 7, line A (which corresponds to that shown in Fig. 5, line A) is applied to the tuned circuit comprising the capacity member 61 and the inductance member 31 and the condenser 61 is charged to a negative potential to produce the leading portion of each of the waves 301, 302, 303 and 304, shown in line C of Fig. 7. The trailing portion of each of these pulses is produced by the condenser discharging through the inductance member 31, but the oscillation is prevented from going far in the positive direction because of grid current being set up in tube V3, thus damping the oscillation. Fig. 7, line D, shows the output pulses 311, 312, 313 and 314 of the tube V3 produced in a similar manner as the pulses 151, 152, 153 and 154 in the circuit of Fig. 2. These pulses are amplified by the amplifier 36 as in the circuit of Fig. 2. In the oscillations shown at line C of Fig. 7, the pulses 301, 302, 303 and 304 intercept the zero axis at a point where the time $t$ is very nearly given by the expression $$t = \frac{T}{4} + \frac{\Delta t}{2}$$

where $$T = \frac{2\pi}{\omega}$$

which is the period of the oscillation as determined by the constants of the tuned circuit and $\Delta t$=duration of the driving pulses 131, 132, 133 and 134. The time $t$ is taken equal to zero at the start of the input pulse. Thus, if the width $\Delta t$ varies as in the pulses shown in Fig. 7, line B, the width of the pulses 321, 322, 323, and 324 varies slightly.

The choice of circuit, that is, whether that of Fig. 2, or of Fig. 2 as modified by substituting one of the circuits shown in Fig. 3 or 4 for part of Fig. 2, is determined by a number of conditions. Thus, if output pulses narrower than the input pulses are desired, one of the circuits shown in Fig. 2 and Fig. 3 is used, while if a wider output pulse is desired, the circuit of Fig. 4 is used. As between the circuits of Figs. 2 and 3, the former is chosen when the output pulses are to be initiated substantially simultaneously with the leading edge of the input pulse, and the latter when the output pulses are to be initiated substantially simultaneously with the trailing edges of the input pulses.

While there have been shown and particularly described certain embodiments of the invention for the purpose of explaining its principles and showing its application, it will be obvious to those skilled in the art that many other modifications and variations are possible and it is therefore intended to cover all such modifications and variations as fall within the scope of the invention which is defined in the appended claims.

What is claimed is:

1. The combination of means for receiving a series of pulses spaced apart in time, means for utilizing said pulses to produce a corresponding series of pulses comprising a tuned circuit including a series-connected capacity member, a source of direct potential and an inductance member whereby, in the absence of a received pulse, the capacity member is charged to substantially the voltage of said source, means for causing each of said received pulses to change the potentials on both the terminals of the capacity member by substantially the same amount to cause the potential of the terminal of the inductance member remote from said source to become negative with respect to the other terminal thereof, allowing said capacity member to begin to discharge through said inductance member whereby a substantially cosinusoidal oscillation is started the period of which depends upon the constants of said capacity and said inductance member, unilaterally conducting damping means connected across said inductance member and so poled that current flows therethrough when the terminal of said inductance member remote from said source becomes positive with respect to the other terminal thereof whereby said damping means damps the oscillation after approximately one quarter of an oscillation cycle, and means for utilizing the potential changes across said damping means to produce said second series of pulses.

2. The combination of claim 1 in which said damping means is an electronic space discharge device having a cathode, an anode and a current control element, said cathode being connected to the terminal of said inductance element remote from said condenser and said control element being connected to the other terminal of said inductance element.

3. The combination of claim 1 in which said damping means is an amplifying space discharge device having a cathode, an anode and a current control element, said cathode being connected to the terminal of said inductance element remote from said condenser and said control element being connected to the other terminal of said inductance element, said space discharge device being driven below cut-off value when the potential of the terminal member of the inductance member remote from said source becomes negative with respect to the other terminal thereof, whereby substantially rectangular pulses appear in the anode-cathode circuit of said space discharge device.

BERNARD M. OLIVER.

REFERENCES CITED

The following references are of record in the file of this patent:

UNITED STATES PATENTS

| Number | Name | Date |
|---|---|---|
| 1,940,161 | Barthelemy | Dec. 19, 1933 |
| 2,063,025 | Blumlein | Dec. 8, 1936 |
| 2,118,626 | Smith | May 24, 1938 |
| 2,139,432 | Andrieu | Dec. 6, 1938 |
| 2,237,661 | Ernst | Apr. 8, 1941 |
| 2,398,701 | Firestone | Apr. 16, 1946 |
| 2,420,013 | Rajchman | May 6, 1947 |
| 2,414,968 | Moe | Jan. 28, 1947 |
| 2,442,264 | Kenyon | Jan. 8, 1948 |
| 2,484,763 | Sturm | Oct. 11, 1949 |

FOREIGN PATENTS

| Number | Country | Date |
|---|---|---|
| 520,448 | Great Britain | Apr. 24, 1940 |